United States Patent
Khayrallah et al.

(10) Patent No.: US 8,654,875 B2
(45) Date of Patent: Feb. 18, 2014

(54) METHOD AND APPARATUS FOR MULTI-STREAM RECEIVED SIGNAL PROCESSING IN A COMMUNICATION RECEIVER

(75) Inventors: Ali S. Khayrallah, Mountain View, CA (US); Stephen Grant, Pleasanton, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 661 days.

(21) Appl. No.: 12/847,068

(22) Filed: Jul. 30, 2010

(65) Prior Publication Data

US 2012/0027139 A1 Feb. 2, 2012

(51) Int. Cl.
*H04L 1/02* (2006.01)

(52) U.S. Cl.
USPC ........... 375/267; 375/260; 375/316; 375/346; 375/347

(58) Field of Classification Search
USPC .................... 375/267, 260, 316, 346, 347
See application file for complete search history.

(56) References Cited

U.S. PATENT DOCUMENTS

| 2007/0004366 A1 | 1/2007 | Prasad et al. | |
| 2007/0105595 A1* | 5/2007 | Prasad et al. | 455/562.1 |
| 2009/0154587 A1* | 6/2009 | Cheong et al. | 375/267 |

OTHER PUBLICATIONS

Layec et al.: "Sum discrete-rate maximization with rate and power control in layered space-time coding", IEEE Transactions on Communications, IEEE Service Center, Piscataway, NJ. USA, vol. 57, No. 3, Mar. 1, 2009.
Prasad et al.: "Optimal Successive Group Decoders for MIMO Multiple-Access Channels", IEEE Transactions on Information Theory, IEEE Press, USA, vol. 54, No. 11, Nov. 1, 2008.
Shamai et al.: "A broadcast approach for a single-user slowly fading MIMO channel", IEEE Transactions on Information Theory, IEEE Press, USA, vol. 49, No. 10, Oct. 1, 2003.

* cited by examiner

*Primary Examiner* — Leila Malek

(57) ABSTRACT

The teachings herein provide a method and apparatus for partitioning sets of MIMO streams, for joint processing. In particular, there is an optimum or otherwise best partitioning of a set of MIMO streams into a first subset to be jointly processed and a second subset to be suppressed as interference with respect to that joint processing. Of course, more than one partitioning may be used, e.g., across different joint processing stages and/or at different times, such that all streams of interest are processed. Correspondingly, the present invention provides a method and apparatus for selecting an optimum or otherwise relative "best" subset of MIMO streams for processing together in a joint process, from among a larger set of MIMO streams. The method and apparatus may, for example, be employed in a multi-stage joint processing receiver, where subset selections are performed on a per-stage basis.

20 Claims, 5 Drawing Sheets

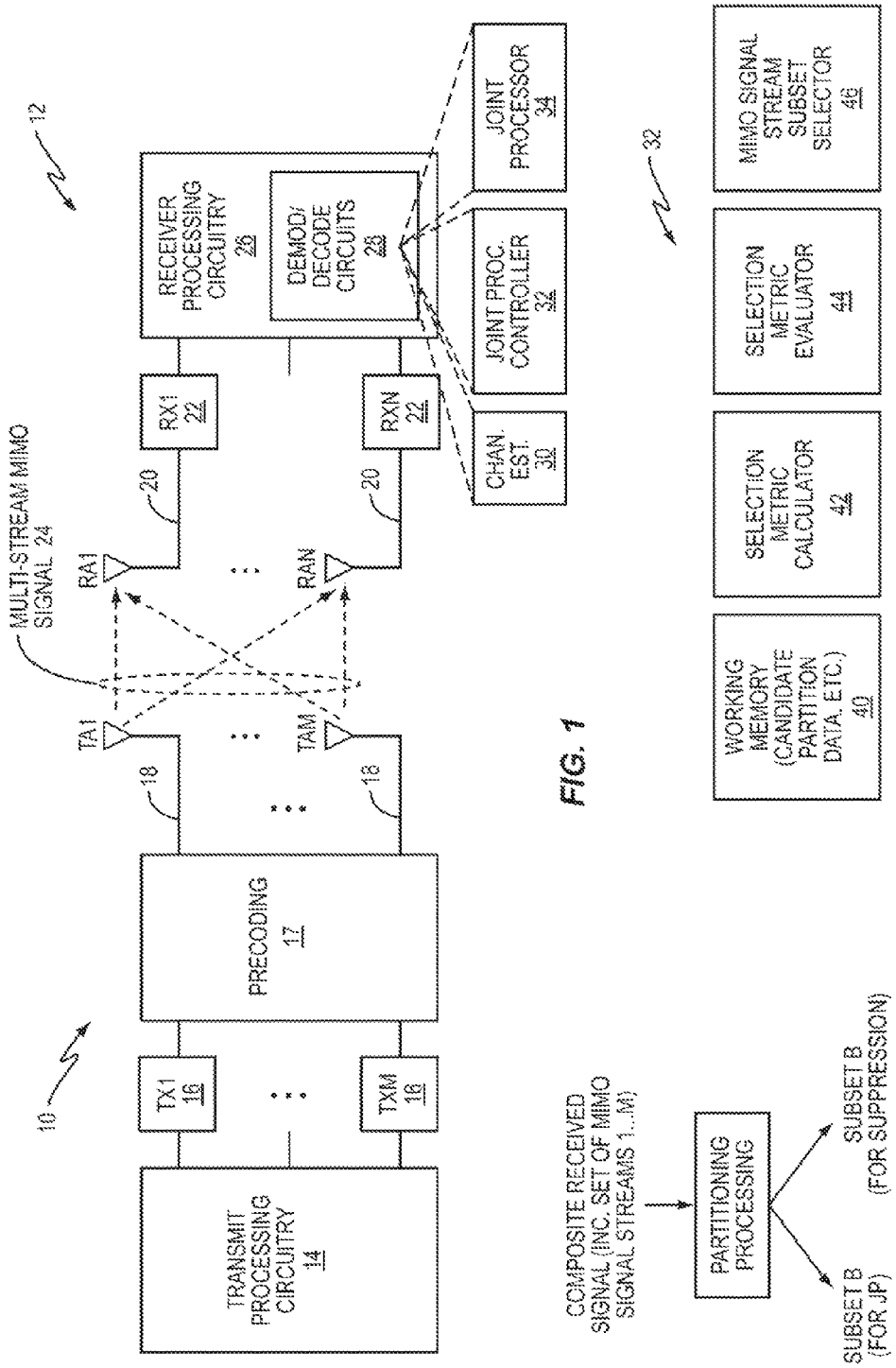

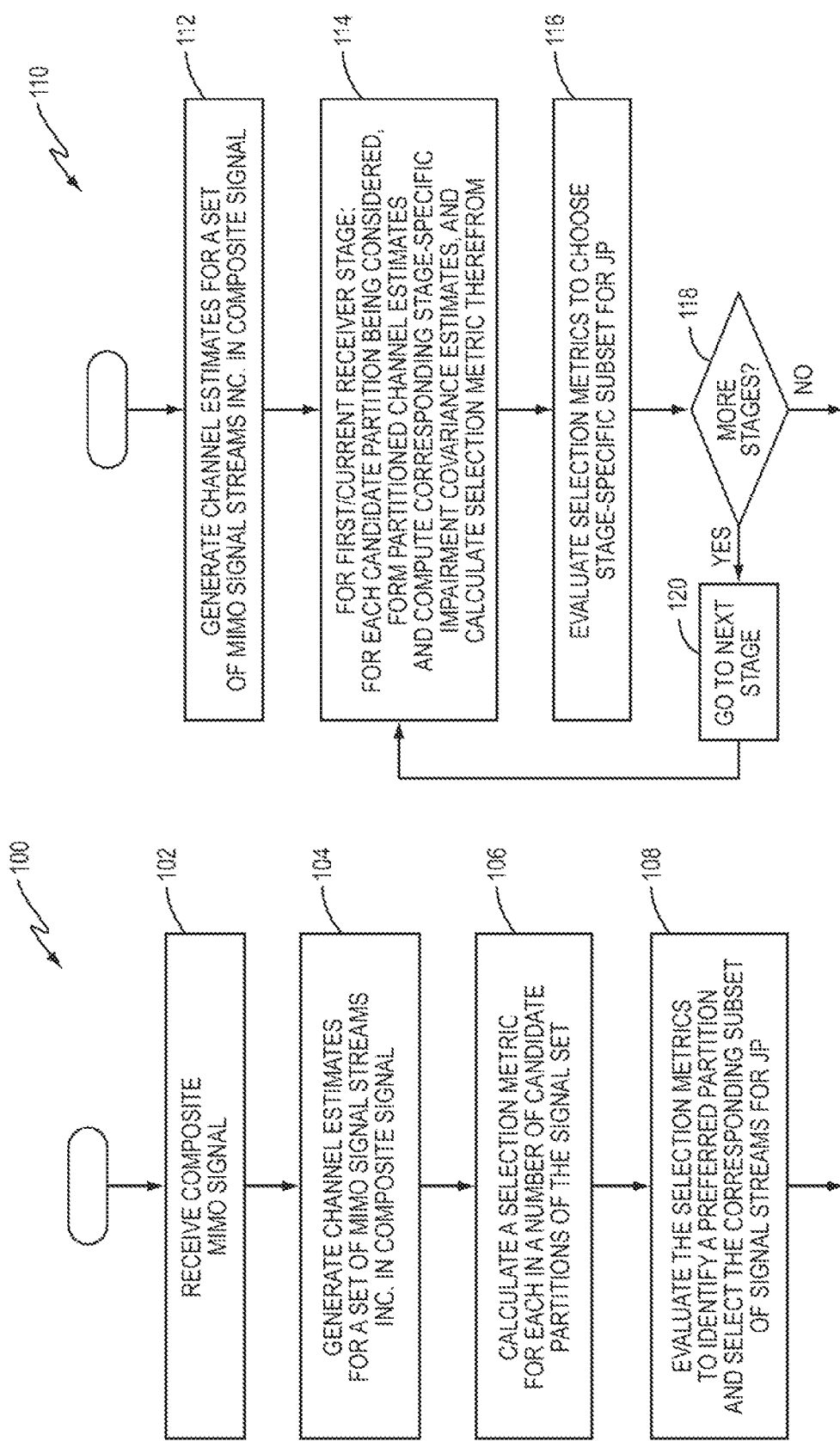

METHOD AND APPARATUS FOR MULTI-STREAM RECEIVED SIGNAL PROCESSING IN A COMMUNICATION RECEIVER

FIELD OF THE INVENTION

The present invention generally relates to Multiple-Input-Multiple-Output (MIMO) communication systems, and particularly relates to joint processing of MIMO streams in a communication receiver.

BACKGROUND

Multiple-Input-Multiple-Output (MIMO) communication systems use multiple antennas at a transmitter and receiver, for the transmission and reception of multiple "streams." MIMO promises significant increases in throughput, but comes at the expense of increased processing complexity at the transmitter and at the receiver. As an example, the 3rd Generation Partnership Project (3GPP) is developing LTE as a fourth-generation wireless communication standard, and that development relies heavily on the use of various MIMO technologies, including transmit diversity, single-user (SU) MIMO supporting up to four spatial multiplexing layers for signal transmission/reception, and multi-user (MU) MIMO, which allows for the allocation of different spatial layers to different users.

In particular, receiver processing complexity can increase significantly, given the need to separate the received MIMO streams, at least to the extent necessary for recovering those streams of interest. For example, Maximum Likelihood Detection (MLD) may be used for multi-stream processing, but such ML-based detection often imposes significant processing and memory requirements on the receiver.

There are lower-complexity alternatives, such as described in U.S. patent application Ser. No. 12/549,132, as filed on 27 Aug. 2009, and in U.S. patent application Ser. No. 12/549,157 (filed on the same day). Those applications provide example details and explanations for a type of multi-stage detector that advantageously uses joint processing for recovering multiple MIMO streams. In particular, these applications describe a "SLIC" receiver structure.

The acronym stands for Serial Localization with Indecision and Color whitening, and SLIC receivers use a multi-stage structure. The indecision feature of SLI derives from the key ingredient of representing the modulation constellation with overlapping subsets. Correspondingly, each SLIC stage includes a joint demodulation (JD) unit capable of handling a subset of the received MIMO streams simultaneously. The remaining streams are treated as colored noise, and suppressed with a pre-filter.

Of course, SLIC receivers are just one example where subsets of MIMO streams are jointly processed, as part of received signal processing. It is advantageously recognized herein that, in SLIC and other contexts, receiver performance is significantly affected by the partitions used to form the subsets of MIMO streams used in joint processing, and overall performance can thereby be improved through better subset selection.

SUMMARY

The teachings herein provide a method and apparatus for partitioning sets of MIMO streams, for joint processing. In particular, there is an optimum or otherwise best partitioning of a set of MIMO streams into a first subset to be jointly processed and a second subset to be suppressed as interference with respect to that joint processing. Of course, more than one partitioning may be used, e.g., across different joint processing stages and/or at different times, such that all streams of interest are processed.

Accordingly, in one embodiment, the present invention provides a method of selecting MIMO signal streams for joint processing in a communication receiver. The method includes generating channel estimates for a set of MIMO signal streams included in a composite received MIMO signal, and calculating a selection metric for each one in a number of candidate partitions. Each candidate partition partitions the set of MIMO signal streams into a first subset slated for joint processing and a second subset slated for suppression as interference. The method further includes evaluating the selection metrics to identify a preferred one of the candidate partitions, and selecting, for joint processing the first subset of MIMO signal streams corresponding to the preferred candidate partition.

In another embodiment, the present invention provides a communication receiver configured to select MIMO signal streams for joint processing. The receiver comprises one or more processing circuits configured to generate channel estimates for a set of MIMO signal streams included in a composite received MIMO signal, and calculate a selection metric for each one in a number of candidate partitions. Each candidate partition partitions the set of MIMO signal streams into a first subset slated for joint processing and a second subset slated for suppression as interference. Further, the receiver is configured to evaluate the selection metrics to identify a preferred one of the candidate partitions, and select for joint processing the first subset of MIMO signal streams corresponding to the preferred candidate partition.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a MIMO communication system, including a transmitter and a receiver, where the receiver is configured for MIMO stream subset selection, for joint processing.

FIG. 2 is a block diagram of an example circuit implementation, which is physically, or at least functionally, realized within the signal processing circuitry of a receiver, such as the one depicted in FIG. 1.

FIG. 3 is a diagram illustrating an example of MIMO stream "partitioning" into different subsets.

FIG. 4 is a logic flow diagram illustrating one embodiment of a method of subset selection, for joint processing of MIMO streams.

FIG. 5 is a logic flow diagram illustrating one embodiment of a method of subset selection, for joint processing of MIMO streams on a per-stage basis in a multi-stage detector, such as might be used in the receiver of FIG. 1.

DETAILED DESCRIPTION

Figure 7:
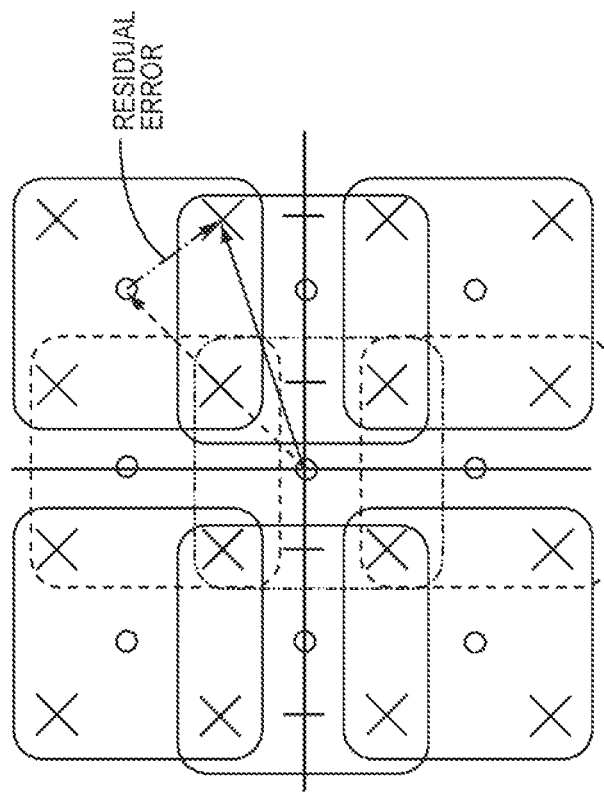
FIG. 7 is a diagram illustrating the overlapping constellations formed within a larger constellation, for the centroid-based processing used in a multi-stage SLIC receiver.

FIG. 1 illustrates a transmitter apparatus ("transmitter") 10 and a receiver apparatus ("receiver") 12 that together form a Multiple-Input-Multiple-Output (MIMO) wireless communication "system." In this regard, the transmitter 10 includes transmit processing circuitry 14 that is configured to provide symbol streams or the like to a plurality of transmitters 16 (denoted as TX1 through TXM). The transmitters 16 include or are associated with precoding circuitry 17, which takes the multiple transmitter outputs and maps them to a plurality of antennas within an antenna arrangement 18 (denoted as having antennas TA1 through TAM). (Such precoding is used, for example, in both LTE and HSPA.)

Correspondingly, the receiver 12 includes a plurality of receive antenna arrangements 20 (denoted as RA1 through RAN), each associated with a corresponding receiver 22 (denoted as RX1 through RXN). (Note that the receivers 22 may in themselves be "complete" receivers, but also may comprise pre-processing signal chains that include amplifiers, filters, down-converters, digitizers, and selected digital processors.)

The (digitized) signals output by the receivers 22 represent a multi-stream MIMO signal 24, for processing via receiver processing circuitry 26. In particular, the receiver processing circuitry 26 includes demodulation/decoding circuits 28. In turn, the demodulation/decoding circuits 28 include a channel estimation circuit 30, a joint processing controller 32, and joint processor 34. Such circuitry comprises fixed hardware, or programmable hardware, or a combination of both.

In one or more embodiments, the receiver 12 is configured to select MIMO signal streams for joint processing, such as in a case where a total of M MIMO streams are to be processed K streams at a time (where K<M). The communication receiver 12, as illustrated, comprises one or more processing circuits—e.g., the processing circuitry 26—configured to: generate channel estimates for a set of MIMO signal streams included in a composite received MIMO signal; calculate a selection metric for each one in a number of candidate partitions, wherein each candidate partition partitions the set of MIMO signal streams into a first subset slated for joint processing and a second subset slated for suppression as interference; evaluate the selection metrics to identify a preferred one of the candidate partitions; and select for joint processing the first subset of MIMO signal streams corresponding to the preferred candidate partition.

In support of such processing, the receiver 12 is configured to calculate the selection metric for each candidate partition as a predictor of receiver performance, assuming the particular partitioning of the set of MIMO signals proposed by the candidate partition. In at least one embodiment, the receiver 12 calculates a maximum total bit rate as the predictor of receiver performance. More broadly, the receiver 12 is configured to calculate the selection metric for each candidate partition as a function of first and second impairment covariance estimates corresponding to the first and second subsets of MIMO signal streams, as defined by the candidate partition.

Computing the selection metric for each candidate partition as a function of the covariance estimates corresponding to the first and second subsets of MIMO streams defined by the candidate partition is one example of basing the selection metrics on the channel estimates (here, second-order channel statistics). Doing so represents an advantageous approach to selection metric computation; namely, the selection metric preferably is "pre-demodulation" criteria. In this regard, then, the selection metric is advantageous in that it can be calculated without benefit of demodulation or decoding, and therefore is readily determined in advance of such processing.

As an example, each candidate partition of the set of MIMO streams correspondingly defines a partitioning of the channels corresponding to the full set of MIMO signal streams. That is, the channel estimates for the full set are divided according to the partitioning of MIMO signal streams between the first and second subsets of the candidate partition being considered. Accordingly, the receiver 12 is configured to calculate the selection metric by, for any given candidate partition, forming partitioned channel estimates corresponding to the partitioned channels, computing impairment covariance estimates corresponding to the partitioned channels, and predicting a maximum total bit rate that could be supported over the partitioned channels, such that the preferred candidate partition is the one corresponding to the highest predicted maximum total bit rate.

Of course, the above approach is only one example of selection metric computation. However, the receiver 12 is configured to compute the selection metrics for the candidate partitions by selecting the candidate partition whose selection metric indicates the optimum (at least the "relative" optimum) value of the performance characteristic represented by the selection metrics. Correspondingly, in one or more embodiments, the receiver 12 is configured to process the selected first subset of MIMO streams in a joint process, and to suppress the corresponding second subset of MIMO streams via filtering, as colored interference.

One example of joint processing contemplated herein is based on the SLIC receiver architecture described in the Background of this document. In particular, in at least one embodiment, the joint processor 34 in FIG. 1 comprises a multi-stage detector circuit configured as a SLIC receiver that performs a joint demodulation process at each stage, based on selecting a particular subset of MIMO signal streams to be jointly demodulated at each stage. Such per-stage selections are made according to the candidate partition evaluations taught herein.

In a particular embodiment, the disclosed SLIC receiver is configured to select the particular subset of MIMO signal streams at each stage, based on calculating the selection metrics at each stage in dependence on stage-specific impairment covariance estimates corresponding to the candidate partitions considered at each stage. In the same or another embodiment, the SLIC receiver at each stage is configured to jointly demodulate the first subset of MIMO signal streams defined by the preferred candidate partition, as determined for that stage, and to suppress the second subset of MIMO signal streams via colored noise filtering.

In one such configuration, the SLIC receiver is configured, for each stage, to jointly demodulate the first subset of MIMO signal streams via parallel joint detection, wherein the first subsets of MIMO signal streams corresponding to the candidate partitions considered at each stage are unordered, or to jointly demodulate the first subset of MIMO signal streams via serial joint detection. With serial joint detection, the subsets of MIMO signal streams considered at each stage are ordered. For example, with serial joint detection, the subset ordering "AB" could have different performance than the subset ordering "BA."

Also, as noted, a maximum bit rate calculation may be used to drive candidate partition evaluation and selection for each stage. Thus, in at least one embodiment, the SLIC receiver is configured to calculate the selection metric, for any given candidate partition at any given stage of the SLIC receiver, as an estimate of the maximum total bit rate that could be supported over the partitioned channels corresponding to the partitioning of MIMO signal streams defined by the given candidate partition. Further, the SLIC receiver is configured to identify the preferred candidate partition for that stage by determining which, among the candidate partitions considered at that stage, corresponds to the highest one of the estimated maximum total bit rates. And, as will be detailed later herein, the predicted maximum total bit rate for each candidate partition may be computed as the sum of mutual information across the first and second subsets defined by the candidate partition.

In one or more SLIC embodiments, the joint processor 34 implements a SLIC receiver using JD units configured to operate in parallel on disjointed stream subsets. In another embodiment, the JD units are configured as serial processing stages, or, one JD unit is configured to operate serially, on successively selected subsets of streams. Regardless, an important factor in overall receiver performance is the selection of the particular subsets of streams to be processed together. One advantageous aspect of the present invention is that the joint processing controller 32 is configured to optimize or otherwise strategically select the particular subset(s) of streams to be processed jointly.

In particular, the joint processing controller 32 is configured to select which subset(s) of M streams are processed together—i.e., jointly processed—and which remaining streams are suppressed via pre-filtering as colored noise. In a multi-stage implementation of the joint processor 34, SLIC-based or otherwise, the joint processing controller 32 is configured to make such selections on a per-stage basis.

For example, assume that all M streams are of interest, and will be processed using two joint processing stages. In this case, the joint processing controller 32 would, for example, identify a preferred subset of "A" streams to be jointly processed in the first joint processing stage, with the remaining "B" streams suppressed (via filtering) as colored noise (A+B=M). The next joint processing stage would, for example, then jointly process the B streams and suppress the A streams. Of course, there may be A, B, and C (and so on) subsets of streams formed from the total of M streams, and the subsets may overlap, or may be dynamically adjusted in size or membership for each selection decision.

In general, however, it is recognized herein that the selection of streams to be processed jointly can be tied to the evaluation of a selection metric that reflects or otherwise indicates the processing performance expected for that subset. In this manner, the joint processing controller 32 operatively drives subset selection to improve joint processing performance and FIG. 2 illustrates one example implementation of the joint processing controller 32.

In FIG. 2, the joint processing controller 32 includes working memory 40, a selection metric calculator 42, a selection metric evaluator 44, and a (MIMO) signal stream subset selector 46. (These circuits are, in at least one embodiment, functional implementations within digital signal processing circuitry, e.g., within a digital signal processor or other digital processing logic.) The working memory 40 holds received signal data, for example, for forming and evaluating "candidate" partitions. Here, a "candidate partition" is the subdivision of M streams into a first subset slated for joint processing, and a second subset slated for suppression as colored interference. (Of course, as noted, an overall set of M streams may be processed in multiple stages, and the candidate partition evaluation may be carried out for each such stage, such that different stages use different candidate partitions but where, if desired, all M streams ultimately are processed.)

According to the example configuration depicted in FIG. 2, the selection metric calculator 42 calculates a selection metric for each such candidate partition, and the selection metric evaluator 44 evaluates those metrics—e.g., to identify a "best" one of them. Correspondingly, the subset selector 46 uses the evaluation results to select the particular candidate partition that will be used to define which streams are processed together in a joint processing operation, and which streams will be suppressed as noise, with respect to that joint processing.

FIG. 3 illustrates this case precisely, where a received composite signal includes a set of M MIMO streams. In FIG. 3, portioning processing is used to divide the M streams into subset A, to be joint processed together, and subset B, to be suppressed as colored noise, with respect to the joint processing of subset A. Further, it should be noted that, in one or more embodiments, all of the M streams are of interest. Thus, such processing may comprise dividing the M streams into subsets A and B and suppressing the streams in subset B as colored noise with respect to jointly processing the streams in subset A, and suppressing the streams in subset A as colored noise with respect to jointly processing the streams in subset B.

Those skilled in the art will thus appreciate that the teachings herein are applicable to essentially any joint processing case, where k streams are to be jointly processed r streams at a time and r<k. Such a case arises anytime the joint processing circuitry is not dimensioned for the full number of streams of interest. More broadly, these teachings apply to essentially any joint processing case where there is some flexibility in selecting which particular streams, from among a larger set, are to be taken together for joint processing.

In terms of carrying out the above processing according to any of the examples given, those of ordinary skill in the art will appreciate that the circuitry shown in FIGS. 1 and 2 is implemented for example using one or more types of digital processing circuits. Example circuits include DSPs or other types of microprocessors. Such circuitry can be configured as a particular machine specially adapted to carry out the present invention, according to the algorithms and functional processing details set forth herein. And, as is well understood, such a configuration may be based at least in part on the execution of computer program instructions stored in memory or another computer-readable medium.

FIG. 4 illustrates an example processing algorithm that is implemented in the receiver 12, such as by fixed hardware and/or by programmable hardware as configured according to the execution of stored computer program instructions. The method 100 includes receiving a composite MIMO signal (Block 102), where "composite" denotes that the received signal includes multiple MIMO streams. It will be appreciated that the composite received signal, as received on the receiver antennas 20, is filtered, down-converted, and digitized, as needed, to create digital sample streams corresponding to the antenna-received signals.

The method 100 further includes generating channel estimates for a set of MIMO signal streams included in a composite received MIMO signal (Block 104); calculating a selection metric for each one in a number of candidate partitions, wherein each candidate partition partitions the set of MIMO signal streams into a first subset slated for joint processing and a second subset slated for suppression as interference (Block 106); evaluating the selection metrics to identify a preferred one of the candidate partitions, and selecting for joint processing the first subset of MIMO signal streams corresponding to the preferred candidate partition (Block 108).

FIG. 5 generally corresponds to the method 100 set forth in FIG. 4, but it includes advantageous, stage-specific processing details. Thus, as with the method 100, the processing of method 110 includes generating channel estimates for a set of MIMO signal streams received in a composite signal (Block 112). However, stage-specific processing is set forth in Block 114. There, for a first (joint) processing stage, and for each candidate partition being considered, the receiver 12 forms partitioned channel estimates and computes corresponding impairment covariance estimates. The covariance estimates are used (directly or indirectly) to calculate a selection metric for the candidate partition, and the selection metrics so determined for the candidate partitions under consideration are evaluated, to choose the stage-specific subset of MIMO streams to be jointly processed (Block 116). If there are more stages (Yes from Block 118), then processing advances to the next stage (Block 120). In this regard, the processing of Blocks 112, 114, and 116 is repeated for the next stage, using stage-dependent computations of impairment covariance.

To better understand such processing, consider a MIMO scenario with M transmitted streams, given by $$r = Hc + n \quad \text{(Eq. 1)}$$

Here r is an N×1 vector of received samples, H is an N×M channel coefficient matrix where the columns correspond to the M transmitted streams, c is a M×1 vector of transmitted symbols corresponding to the M transmitted streams, and n is an N×1 vector of zero-mean complex Gaussian noise samples. This scenario also assumes that the noise is colored and has the covariance matrix R.

Without much loss in generality, and without implying any limitations on the present invention, one may assume that all M signals are from the same constellation Q of size q, and all M signals are transmitted with the same average energy per symbol, which is normalized to 1. The effective constellation for c is of size $q^M$.

This model is general enough to apply to the case of both spread spectrum systems (e.g., HSPA) and OFDM systems (e.g., LTE). For example, the transmitter apparatus 10 comprises a radio network transceiver, such as an eNodeB in a Long Term Evolution (LTE) network, or a base station in a Wideband CDMA (WCDMA) network that provides High Speed Packet Access (HSPA). In a corresponding (and also non-limiting) example, the receiver apparatus 12 comprises an item of user equipment (UE), such as a smart phone or PDA, a laptop computer, or essentially any other type of wireless communications device. As such, the transmitter 10 and receiver 12 may be potentially complex communication transceivers, supporting control and data signal transmission and reception between them.

Regardless, in the HSPA case, the received samples in r correspond to a particular channelization code and are collected post-despreading. The columns of H contain net channel responses which are a function of the tap gains and delays of the medium channel responses, the chip pulse shape, and the delays of the processing elements in the receiver 12 that are used for received-signal detection (e.g., Rake/G-Rake fingers, chip-equalizer filter taps, etc.). In this case N is the total number of fingers or other processing elements placed on all receive antennas 20. The vector n models multiple access interference, inter-symbol interference, and noise.

In the case of OFDM systems, the received samples in r correspond to a particular subcarrier and are collected after FFT processing. The columns of H contain samples of the various channel frequency responses, and in this case N is equal to the number of receive antennas 20. The vector n models noise and other-cell interference. The model also applies to systems in which the transmitted streams are either precoded or not. In the case of precoding, the columns of H are interpreted as "effective" channel responses, and are a function of the precoding weights and the physical channel responses corresponding to the various transmit antennas 18 used for MIMO transmission.

Figure 6:
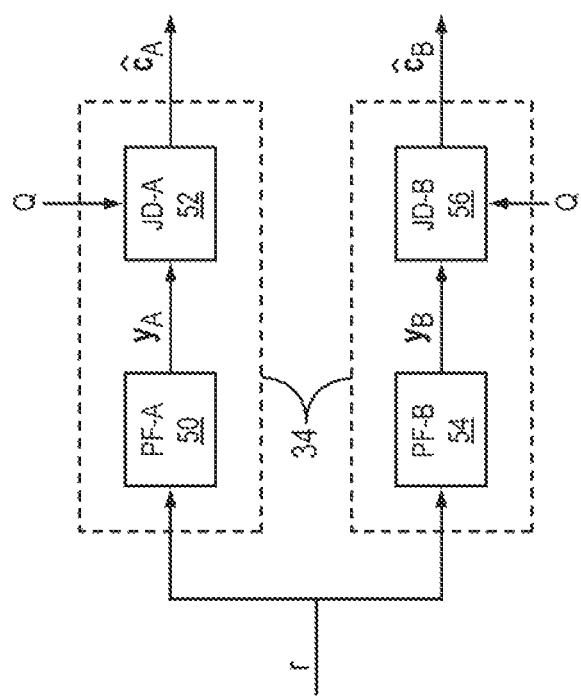
FIG. 6 is a block diagram illustrating one embodiment of processing circuitry, which may be used for jointly processing different subsets of MIMO streams.

Consider the example joint processor 34 shown in FIG. 6. Here, M (MIMO) streams are partitioned into two subsets, A and B with respective sizes $M_A$ and $M_B$. As an example, let M=4 and subsets A and B each contain two streams. Correspondingly, the joint processor 34 includes a processing chain for the two MIMO streams in subset A, which includes a whitening pre-filter 50 (denoted as PF-A), and a JD unit 52 (denoted as JD-A). A further processing chain is included for the other two MIMO streams in subset B, where that processing chain includes a whitening pre-filter 54 (denoted as PF-B) and a JD unit 56 (denoted as JD-B).

The filter circuit PF-A is configured to suppress the MIMO streams in subset B, by modeling them as colored noise. That suppression leaves the two streams in subset A for processing by JD-A in a two-symbol JD process—i.e., the signal r including M streams is filtered by PF-A, to produce the filtered signal $y_A$ in which the streams in subset B are substantially suppressed, and the filtered signal $y_A$ is processed in JD-A using joint demodulation, for example, to detect symbols in the two MIMO streams included in subset A.

As shown, JD-A operates on the constellation Q which enumerates hypothesized values for each of the symbols participating in the joint detection. For example, if the original constellation is 16-QAM, there are q=16 possible symbols values, and the JD-A considers $q^2=256$ possibilities.

It is helpful to write the received sample vector as follows $$r = H_A c_A + H_B c_B + n \quad \text{(Eq. 2)}$$
$$= H_A c_A + n_A$$

where the interference plus noise term $n_A$ has covariance matrix $$R_A = H_B H_B^H + R \quad \text{(Eq. 3)}$$

In the above, the 2×1 symbol vector $c_A$ contains the two symbols in subset A according to one of 6 possible groupings, as explained later. The 2×1 symbol vector $c_B$ contains the 2 symbols in subset B. The N×2 matrices $H_A$ and $H_B$ each contain two columns of the original channel matrix H that corresponds to the symbols in $c_A$ and $c_B$, respectively.

A pre-filter $W_A$ (implemented within PF-A) is applied to the received sample vector r where the N×2 prefilter is given by $$W_A = R_A^{-1} H_A \quad \text{(Eq. 4)}$$

This pre-filter signal processing results in the equivalent 2×2 MIMO model $$y_A = W_A^H r \quad \text{(Eq. 5)}$$
$$= S_A c_A + z_A$$

with a new effective 2×2 channel $$S_A = H_A^H R_A^{-1} H_A \quad \text{(Eq. 6)}$$

and colored noise $z_A = W_A^H n_A$ with covariance $S_A$. This may be interpreted as a generalized SINR matrix. Through pre-filtering, the interference due to the symbols in subset B are suppressed linearly in the process of jointly detecting the symbols in subset A.

In an example embodiment, the joint detection metric "follows" the pre-filter, and is given by $$m(\hat{c}_A) = -2Re\{\hat{c}_A^H y_A\} + \hat{c}_A^H S_A \hat{c}_A \quad \text{(Eq. 7)}$$

In turn, JD-A considers all $q^2$ candidates $\hat{c}_A$ to find the one with the smallest joint detection metric (here, the "smallest" joint detection metric reflects the best one). Likewise, JD-B of the receiver 12 aims to jointly detect the two symbols in subset B while linearly suppressing (whitening) interference from subset A. The formulation of the corresponding quantities for the B processing path is similar.

The overall demodulator with the two components JD-A and JD-B is referred to as a JD over subsets (JDOS). In at least one embodiment, it is used as a component in each stage of a multi-stage SLIC implementation of the joint processor 34. The teachings herein propose using a conditional mutual information measure—referred to a "selection" metric—as the basis for optimizing the symbol groupings in subsets A and B for JDOS, or other joint processing.

The first portion of the selection metric is the mutual information between $c_A$ and $y_A$ conditioned on the channel matrix H and is denoted $I(c_A; y_A | H)$. To derive an expression for this, note that the mutual information is invariant under a linear transformation of $y_A$. The following transformation is useful, because it de-correlates (whitens) the noise samples in the vector $z_A$.

$$y'_A = S_A^{-1/2} y_A \quad \text{(Eq. 8)}$$
$$= S_A^{1/2} c_A + z'_A.$$

Here $z'_A = S_A^{-1/2} z_A$ is the transformed noise vector and has covariance $I_2$ (2×2 identity matrix) as desired. With this transformation, one has $$I(c_A; y_A | H) = I(c_A; y'_A | H) \quad \text{(Eq. 9)}$$
$$= \log \det[I_2 + S_A]$$
$$= \log \det[I_2 + H_A^H R_A^{-1} H_A].$$

The term $I(c_A; y_A | H)$ is the maximum bit rate that can be supported over the effective channel between $c_A$ and $y_A$. Likewise, the mutual information between $c_B$ and $y_B$ is given by $$I(c_B; y_B | H) = \log \det[I_2 + H_B^H R_B^{-1} H_B] \quad \text{(Eq. 10)}$$

where $R_B$ is given by an expression identical to (Eq. 3), except with 'A' and 'B' swapped in every subscript location. The sum mutual information across the two subsets is then given by $$I(H, A, B) = I(c_A; y_A | H) + I(c_B; y_B | H). \quad \text{(Eq. 11)}$$

Thus I(H, A, B) is the maximum total bit rate that can be supported over the effective A and B channels. According to one or more embodiments presented herein, the receiver 12 is configured to interpret I(H, A, B) as a predictor of the performance of the JDOS receiver for the particular partition (A, B). In particular, in a SLIC receiver implementation of the joint processor 34, or other multi-stage receiver implementations, the receiver 12 uses I(H, A, B) computed on a per-stage basis, to select a particular partition (A, B) for each stage. Strictly speaking, for (Eq. 9) and (Eq. 10) to hold, the symbol values in $c_A$ and $c_B$ should be drawn from a continuous complex Gaussian distribution rather than the finite alphabet Q. However, for the purposes of optimizing the symbol groupings in subsets A and B, this restriction is ignored in the processing contemplated for implementation within the receiver 12.

Continuing with the SLIC example, a general idea of SLIC is to represent transmitted symbols by a series of approximations. In an L-stage SLIC implementation of the joint processor 34, the symbol vector is effectively represented as $$c = c^{[1]}L + c^{[L]} \quad \text{(Eq. 12)}$$

where stage i detects component $c^{[i]}$, using an effective alphabet derived from the true alphabet Q.

For simplicity, this explanation considers a special case of SLIC, which nonetheless captures the key characteristics of SLIC processing. In the first stage, the constellation Q is approximated by a set of centroids $Q^{[1]}$, of size $q^{[1]} < q$. Each centroid represents a subset of Q. Moreover, the subsets have three properties: (1) the subsets overlap; (2) their union is equal to Q; and (3) all the subsets are shifted versions of the same set $O^{[1]}$ with centroid equal to 0. The overlap property is a key ingredient, as it enables the indecision feature of SLIC, which boosts demodulation performance.

If L>2, in the second stage $O^{[1]}$ plays the role of Q. That is, $O^{[1]}$ is approximated by a set of centroids $Q^{[2]}$, of size $q^{[2]}$, with the three properties, based on a set $O^{[2]}$ with centroid 0. One may proceed similarly for all stages except the last. At the last stage L, there is no more approximation, and $Q^{[L]} = O^{[L-1]}$. The outcome consists of the sets $Q^{[1]}, \ldots, Q^{[L]}$, which serve as the effective constellations for the L stages of the SLIC receiver.

For example, consider a 2-stage SLIC, where Q is the 16-QAM constellation, shown in FIG. 7. Here, the centroid constellation $Q^{[1]}$ is chosen to contain: the 9 centroids indicated with the small circles depicted in the four quadrant diagram of FIG. 7. Each centroid represents a subset, which is a shifted version of the set $O^{[1]}$ containing the four symbols of Q nearest the origin (QPSK). Also, the subsets overlap. One may use $Q^{[1]}$ as the effective constellation for the first stage, and $Q^{[2]} = O^{[1]}$ as the effective constellation for the second stage. Note that demodulation using the centroids in $Q^{[1]}$ creates a mismatch with the transmitted symbols from Q, resulting in a residual error signal, as illustrated in FIG. 7.

Figure 8:
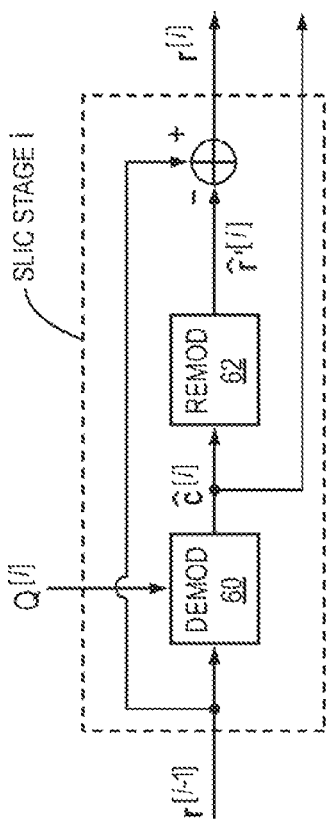
FIG. 8 is a block diagram illustrating further example details for one stage of a SLIC receiver structure.

FIG. 8 depicts stage i of an example SLIC receiver, such as is implemented in one or more embodiments of the joint processor 34. The input is the modified received signal $r^{[i-1]}$ from stage (i−1)—i.e., the i-th stage operates on the version of the received signal that is provided by the preceding (i−1)-th stage. The constellation $Q^{[i]}$ consists of centroids. The demodulation unit 60 outputs decisions $\hat{c}^{[i]}$. The demodulation unit 60 may use one of many possible techniques. For example, it may use the "JD over subsets" method described earlier in reference to FIG. 6. (In this regard, the demodulation circuit 60 may be understood as subsuming the pre-filter 50 and JD unit 52 (or 54 and 56) depicted in FIG. 6.)

In turn, a remodulation unit 62 generates the remodulated signal $\hat{r}'^{[i]} = H\hat{c}^{[i]}$ is subtracted from $r^{[i-1]}$ to produce the modified received signal $r^{[i]}$, which is fed to stage (i+1). Here, the input to stage 1—the first stage—is the original received signal r. For the last stage L, the constellation $Q^{[L]}$ is a subset of Q. There is also no need for a re-modulation block in the last stage. With this arrangement, the overall symbol decision is found by adding all the intermediate decisions $$\hat{c}=\hat{c}^{[1]}+L+\hat{c}^{[L]} \qquad (\text{Eq. 13})$$

Figure 9:
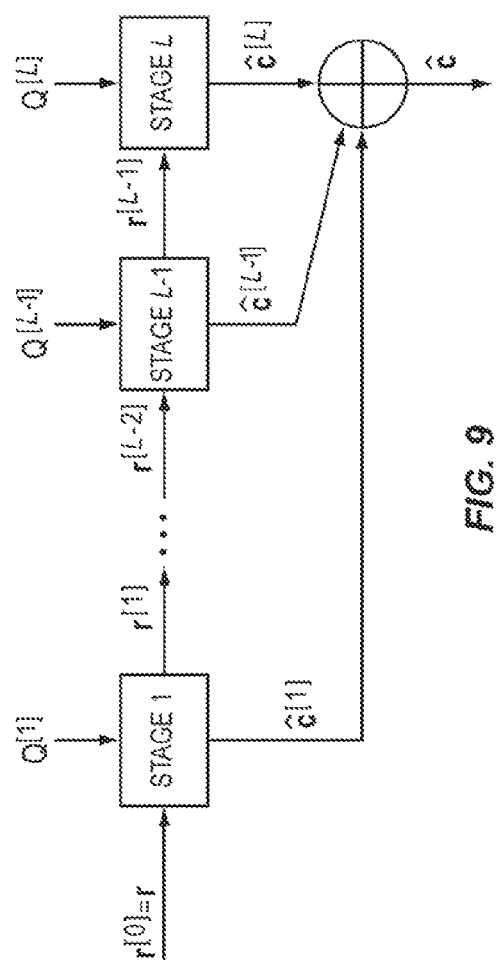
FIG. 9 is a block diagram illustrating an example overall, multi-stage SLIC receiver structure.
Figure 10:
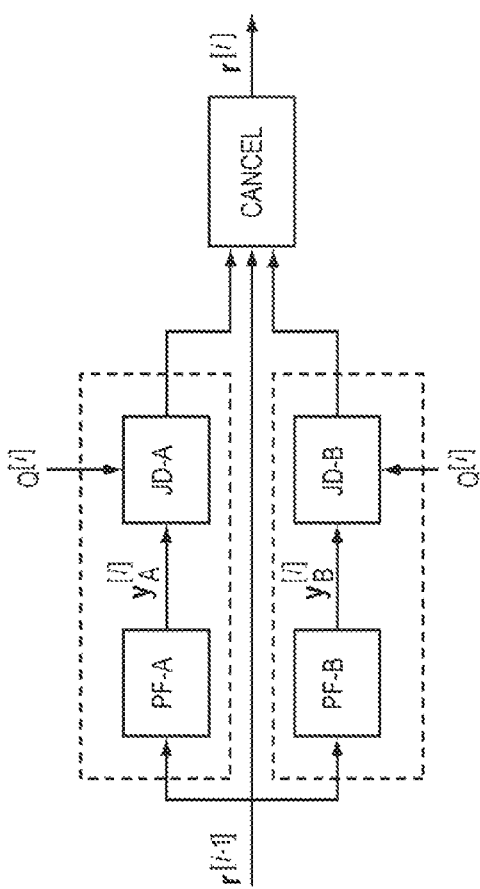
FIG. 10 is a block diagram illustrating processing circuitry used in parallel joint detection processing, where two or more subsets of MIMO streams are processed jointly, in parallel.

The corresponding overall SLIC structure is shown in FIG. 9, and FIG. 10 depicts one stage of the overall SLIC structure, assuming the use of JDOS for joint processing at each stage. In particular, FIG. 10 depicts a parallel form of JDOS, and again uses examples of the pre-filters 50/54 and JD units 52/56 introduced in FIG. 6. The input signal $r^{[i-1]}$ is modeled as $$r^{[i-1]}=H_A d_A + H_B d_B + n \qquad (\text{Eq. 14})$$

where $d_A$ is the remaining portion of the signal $c_A$ after the subtraction of the earlier (i−1) intermediate decisions. In other words, $$d_A = c_A - (\hat{c}_A^{[1]} + L + \hat{c}_A^{[i-1]}) \qquad (\text{Eq. 15})$$

and similarly for $d_B$. Furthermore, in JD-A, $d_A$ is modeled as $$d_A = c_A^{[i]} + e_A \qquad (\text{Eq. 16})$$

where $c_A^{[i]}$ is made up of symbols from $Q^{[i]}$, and $e_A$ is the residual signal corresponding to the remaining values $(c_A^{[i+1]}, L, c_A^{[L]})$.

Accordingly, one may now write $$r^{[i-1]} = H_A c_A^{[i]} + n_A \qquad (\text{Eq. 17})$$

where $$n_A = H_A e_A + H_B d_B + n \qquad (\text{Eq. 18})$$

Now $n_A$ has covariance matrix $$R_A = E_{e_A} H_A H_A^H + E_{d_B} H_B H_B^H + R \qquad (\text{Eq. 19})$$

where $E_{e_A}$ and $E_{d_B}$ are the energy values corresponding to $e_A$ and $d_B$, respectively. Note that $E_{e_A}$ and $E_{d_B}$ decrease as the stage index i grows, because there is less and less transmitted signal unaccounted for in the (multi-stage) demodulation process. For stage 1, $d_B = c_B$, so $E_{d_B} = 1$, and $E_{e_A}$ is the energy corresponding to the zero centroid subset $O^{[1]}$. For the last stage, $E_{e_A} = 0$, because there is no residual signal left, and $E_{d_B}$ is the energy corresponding to the last zero centroid set $O^{[L-1]}$.

The pre-filter and the joint detection metric for the JD over subset A can now be computed from the new covariance matrix $R_A$ according to (Eq. 19). Similarly, the new covariance matrix $R_B$ for JD-B, which is given by $$R_B = E_{d_A} H_A H_A^H + E_{e_B} H_B H_B^H + R \qquad (\text{Eq. 20})$$

Here $d_B$ is modeled as $$d_B = c_B^{[i]} + e_B \qquad (\text{Eq. 21})$$

where $c_B^{[i]}$ is made up of symbols from $Q^{[i]}$, and $e_B$ is the residual signal corresponding to the remaining values $(c_B^{[i+1]}, L, c_B^{[L]})$. The corresponding pre-filter and joint detection metric follow.

Again consider stage i with a JDOS demodulation unit. As discussed earlier, for any partition (A, B), the covariance matrices $R_A$ and $R_B$ can be computed by the receiver 12. Following the same steps as before, it can compute the mutual information expressions $I(c_A; y_A | H)$ and $I(c_B; y_B | H)$, and the sum rate I(H, A, B). In at least one embodiment receiver 12 is configured to use I(H, A, B) as a criterion for selecting the best partition (A, B) for stage i, among a set of partition candidates being considered for that stage. The "best" partition (A, B) for JDOS may change from stage to stage, due to the changes in the covariance matrices $R_A$ and $R_B$, see (Eq. 19) and (Eq. 20).

Continuing with the same example as before, consider the four-stream system and a partition with two symbols in A and B. A total of six possible groupings for subset A exist: {1,2}, {1,3}, {2,3}, {1,4}, {2,4}, and {3,4}. Set B then contains the remaining two out of four symbols. Because the parallel JDOS formulation is symmetric in A and B, and so is the sum rate expression, only the unordered groupings need be considered. That is, A={1,2} and B={3,4}, is equivalent to B={1,2} and A={3,4} and there are therefore only three unique values for the six possible groupings listed above. Hence it is only necessary to consider the first three groupings for subset A: {1,2}, {1,3}, and {2,3}.

For any given grouping decision, i.e., at a given stage, an example algorithm for optimizing the partition for a given channel realization H is as follows:

(1) For each unordered candidate partition do the following:
    a. form the matrices $H_A$ and $H_B$ by extracting the columns of H corresponding to subsets A and B, respectively;
    b. compute the covariance matrices $R_A$ using (Eq. 19) and $R_B$ using (Eq. 20); and
    c. compute the sum rate I(H, A, B) using (Eq. 11) and the computed covariances from step b.

(2) Select the partition (A, B) with the maximum value of the sum rate.

Figure 11:
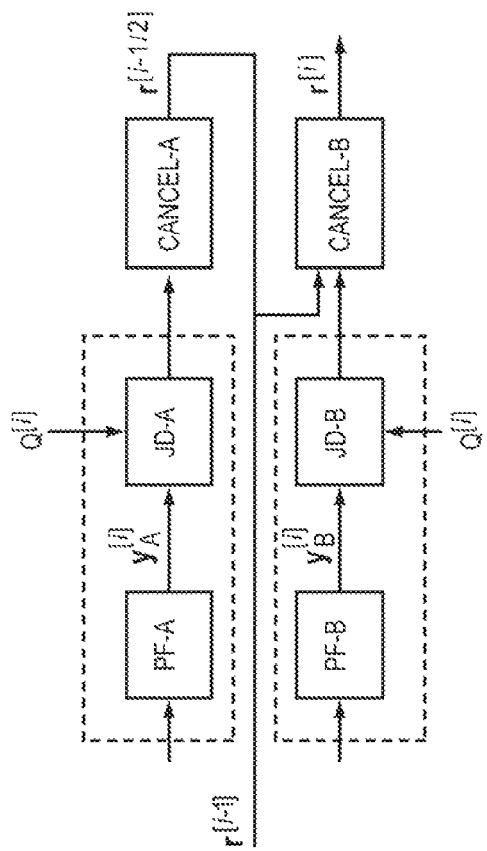
FIG. 11 is a block diagram illustrating a serial processing alternative to FIG. 10, wherein joint processing of a given subset of MIMO streams provides the input for joint processing of another subset of MIMO streams.

In an alternative, serial JDOS demodulation example, such as shown in FIG. 11, the serial processing nature is obtained by subtracting the contribution of signal A from $r^{[i-1]}$ to produce an intermediate signal $r^{[i-1/2]}$, given by $$r^{[i-1/2]} = r^{[i-1]} - H_A \hat{c}_A. \qquad (\text{Eq. 22})$$

Then signal B signal is demodulated using $r^{[i-1/2]}$. The JD-A expressions are unchanged.

In JD-B, $r^{[i-1/2]}$ is modeled as $$\begin{aligned} r^{[i-1/2]} &= H_B d_B + H_A e_A + n \\ &= H_B c_B + (H_B e_B + H_A e_A + n) \\ &= H_B c_B + n_B \end{aligned} \qquad (\text{Eq. 23})$$

The covariance matrix $R_B$ for $n_B$ is now given by $$R_B = E_{e_B} H_B H_B^H + E_{e_A} H_A H_A^H + R \qquad (\text{Eq. 24})$$

Comparing this expression to (Eq. 20), the subtraction of the contribution from subset A has reduced the energy of the term related to subset A from $E_{d_A}$ down to $E_{e_A}$.

Using the four-stream example, in the serial JDOS case, note that the A and B branches are not interchangeable, unlike the parallel JDOS case. Thus the partition (A, B) is now an ordered partition. That is, A={1,2} and B={3,4}, is not equivalent to B={1,2} and A={3,4}. Thus, the receiver 12 is configured to compare the sum rate expression for all six candidate ordered partitions, identified by the subset A: {1,2}, {1,3}, {2,3}, {1,4}, {2,4}, and {3,4}. One example of such an algorithm is given as follows:

(1) For each candidate ordered partition do the following:
    a. form the matrices $H_A$ and $H_B$ by extracting the columns of H corresponding to subsets A and B, respectively;
    b. compute the covariance matrices $R_A$ using (Eq. 19) and $R_B$ using (Eq. 24).
    c. compute the sum rate I(H, A, B) using (Eq. 11) and the computed covariances from step b.

(2) Select the partition (A, B) with the maximum value of the sum rate.

Of course, a number of variations and extensions of these algorithms are contemplated herein. For example, unequal size partitions may be used. Although the examples given above use two subsets both of size 2, the formulation provided is general and can handle unequal size subsets, so the subsets $M_A$ and $M_B$ that partition a larger set of M streams need not be equal. Further, the receiver 12 can be configured to extend the two subset partitions for JDOS to any number of subsets. For a given subset, the streams to be suppressed are all those not included in that subset. So, in this sense, the joint processing applies to one subset of streams, and the suppression applies to the remaining streams, which may logically include any number of subsets. For the multiple subset partition, the receiver 12 may mix serial and parallel blocks within the demodulation unit. For instance, with three subsets A, B and C, the joint processor 34 of receiver 12 may be configured to demodulate subsets A and B in parallel, followed by subset C in series. Further, it should be understood that, in this and other examples described herein, one or more embodiments of the present invention allow for overlapping subsets of streams.

Also, an earlier point was made regarding the determination of mutual information for finite constellations. That is, the formula for $I(c_A;y_A|H)$ assumes a continuous Gaussian constellation. One simple way to better approximate the mutual information to account for the finite constellation at any stage i, is to cap $I(c_A;y_A|H)$ at $M_A \log(q^{[i]})$. Similarly, $I(c_B;y_B|H)$ is capped at $M_B \log(q^{[i]})$. More generally, any approximation of the mutual information may be used to determine the subset partition.

In any case, the present invention in one or more embodiments provides a dynamic selection criterion for choosing the subset partition in each serial or parallel JDOS stage in a SLIC receiver. More broadly, the present invention provides a method and apparatus for identifying the partitioning of a set of M streams into a first subset slated for joint processing, and a second subset slated for suppression. (Of course, such processing may be repeated, or carried out in parallel, using different partitions, so that as many of the M streams that are of interest are ultimately processed.)

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of selecting Multiple-Input-Multiple-Output (MIMO) signal streams for joint processing in a communication receiver, the method comprising:
   generating channel estimates for a set of MIMO signal streams included in a composite received MIMO signal;
   calculating a selection metric for each one in a number of candidate partitions, wherein each candidate partition partitions the set of MIMO signal streams into a first subset slated for joint processing and a second subset slated for suppression as interference and wherein the selection metric is calculated as a function of first and second impairment covariance estimates corresponding to the first and second subsets of MIMO signal streams;
   evaluating the selection metrics to identify a preferred one of the candidate partitions; and
   selecting for joint processing the first subset of MIMO signal streams corresponding to the preferred candidate partition.

2. The method of claim 1, wherein said step of calculating the selection metric for each candidate partition comprises calculating a predictor of receiver performance, assuming a particular partitioning of the set of MIMO signals proposed by the candidate partition.

3. The method of claim 2, wherein the predictor of receiver performance is a maximum total bit rate.

4. The method of claim 1, wherein the communication receiver comprises a multi-stage detector circuit configured as a Serial Localization with Indecision and Color whitening (SLIC) receiver, and further comprising performing said steps of calculating, evaluating, and selecting on a per-stage basis, including determining stage-specific first and second covariance estimates for each stage, for stage-specific joint processing at each stage.

5. The method of claim 4, wherein said performing of said steps of calculating, evaluating, and selecting on a per-stage basis comprises performing a joint demodulation process at each stage, wherein the MIMO signal streams selected at the stage for joint demodulation and the MIMO signal streams selected at the stage for suppression as interference are determined by the preferred candidate partition identified for the stage.

6. The method of claim 5, wherein said step of performing a joint demodulation process at each stage comprises performing joint detections in parallel over the subset of MIMO signal streams selected for joint demodulation, wherein the candidate partitions define unordered first subsets of MIMO signal streams taken from the set of MIMO signal streams, or comprises performing joint detections serially over the subset of MIMO signal streams selected for joint demodulation, wherein the candidate partitions define ordered first subsets of MIMO signal streams taken from the set of MIMO signal streams.

7. The method of claim 4, wherein said step of calculating the selection metric comprises, for any given candidate partition at any given stage of the SLIC receiver, calculating an estimate of the maximum total bit rate that could be supported over partitioned channels corresponding to the partitioning of MIMO signal streams defined by the given candidate partition, and, correspondingly, said step of evaluating the selection metrics comprises, for any given stage of the SLIC receiver, determining which candidate partition corresponds to the highest one of the estimated maximum total bit rates.

8. The method of claim 1, further comprising processing the selected first subset of MIMO streams in a joint process, wherein the corresponding second subset of MIMO streams is suppressed via filtering as colored interference.

9. The method of claim 1, wherein each candidate partition defines a partitioning of the channels corresponding to the set of MIMO signal streams, according to the partitioning of MIMO signal streams between the first and second subsets, and wherein said step of calculating the selection metric comprises, for any given candidate partition, forming partitioned channel estimates corresponding to the partitioned channels, computing impairment covariance estimates corresponding to the partitioned channels, and predicting a maximum total bit rate that could be supported over the partitioned channels, such that the preferred candidate partition is the one corresponding to the highest predicted maximum total bit rate.

10. The method of claim 9, further comprising computing the predicted maximum total bit rate for each candidate partition as the sum of mutual information across the first and second subsets defined by the candidate partition.

11. A communication receiver configured to select Multiple-Input-Multiple-Output (MIMO) signal streams for joint processing, the communication receiver comprising one or more processing circuits configured to:
  generate channel estimates for a set of MIMO signal streams included in a composite received MIMO signal;
  calculate a selection metric for each one in a number of candidate partitions, wherein each candidate partition partitions the set of MIMO signal streams into a first subset slated for joint processing and a second subset slated for suppression as interference, and wherein the selection metric is calculated as a function of first and second impairment covariance estimates corresponding to the first and second subsets of MIMO signal streams;
  evaluate the selection metrics to identify a preferred one of the candidate partitions; and
  select for joint processing the first subset of MIMO signal streams corresponding to the preferred candidate partition.

12. The communication receiver of claim 11, wherein the communication receiver is configured to calculate the selection metric for each candidate partition as a predictor of receiver performance, assuming a particular partitioning of the set of MIMO signals proposed by the candidate partition.

13. The communication receiver of claim 12, wherein the communication receiver is configured to calculate a maximum total bit rate as said predictor of receiver performance.

14. The communication receiver of claim 11, wherein the communication receiver comprises a multi-stage detector circuit configured as a Serial Localization with Indecision and Color whitening (SLIC) receiver that performs a joint demodulation process at each stage, based on selecting a particular subset of MIMO signal streams to be jointly demodulated at each stage, and wherein said SLIC receiver is configured to select the particular subset of MIMO signal streams at each stage, based on calculating the selection metrics at each stage in dependence on stage-specific impairment covariance estimates corresponding to the candidate partitions considered at each stage.

15. The communication receiver of claim 14, wherein the SLIC receiver is configured to, at each stage, jointly demodulate the first subset of MIMO signal streams defined by the preferred candidate partition, as determined for that stage, and to suppress the second subset of MIMO signal streams via colored noise filtering.

16. The communication receiver of claim 15, wherein the SLIC receiver is configured, for each stage, to jointly demodulate the first subset of MIMO signal streams via parallel joint detection, wherein the first subsets of MIMO signal streams corresponding to the candidate partitions considered at each stage are unordered, or to jointly demodulate the first subset of MIMO signal streams via serial joint detection, wherein the first subsets of MIMO signal streams corresponding to the candidate partitions considered at each stage are ordered.

17. The communication receiver of claim 14, wherein the SLIC receiver is configured to calculate the selection metric, for any given candidate partition at any given stage of the SLIC receiver, as an estimate of the maximum total bit rate that could be supported over the partitioned channels corresponding to the partitioning of MIMO signal streams defined by the given candidate partition, and to identify the preferred candidate partition for that stage by determining which, among the candidate partitions considered at that stage, corresponds to the highest one of the estimated maximum total bit rates.

18. The communication receiver of claim 11, wherein the communication receiver is configured to process the selected first subset of MIMO streams in a joint process, and to suppress the corresponding second subset of MIMO streams via filtering, as colored interference.

19. The communication receiver of claim 11, wherein each candidate partition defines a partitioning of the channels corresponding to the set of MIMO signal streams, according to the partitioning of MIMO signal streams between the first and second subsets, and wherein the communication receiver is configured to calculate the selection metric by, for any given candidate partition, forming partitioned channel estimates corresponding to the partitioned channels, computing impairment covariance estimates corresponding to the partitioned channels, and predicting a maximum total bit rate that could be supported over the partitioned channels, such that the preferred candidate partition is the one corresponding to the highest predicted maximum total bit rate.

20. The communication receiver of claim 19, wherein the communication receiver is configured to compute the predicted maximum total bit rate for each candidate partition as the sum of mutual information across the first and second subsets defined by the candidate partition.

* * * * *

UNITED STATES PATENT AND TRADEMARK OFFICE
CERTIFICATE OF CORRECTION

PATENT NO. : 8,654,875 B2
APPLICATION NO. : 12/847068
DATED : February 18, 2014
INVENTOR(S) : Khayrallah et al.

It is certified that error appears in the above-identified patent and that said Letters Patent is hereby corrected as shown below:

In the Specification

In Column 11, Line 36, in Equation (19), delete "$R_A - E_{e_A} H_A H_A{}^H + E_{e_B} H_B H_B{}^H + R$," and insert -- $R_A - E_{e_A} H_A H_A{}^H + E_{d_B} H_B H_B{}^H + R$ --, therefor.

In Column 11, Line 64, delete "embodiment" and insert -- embodiment, the --, therefor.

Signed and Sealed this
Eighth Day of July, 2014

Michelle K. Lee
*Deputy Director of the United States Patent and Trademark Office*